United States Patent [19]
Maruoka et al.

[11] Patent Number: 5,703,657
[45] Date of Patent: Dec. 30, 1997

[54] VIDEO DISPLAY IN WHICH A SCREEN MODE FOR DIFFERENT INPUT SIGNALS IS SET BASED ON STORED INFORMATION

[75] Inventors: Kazuhisa Maruoka, Kanagawa; Etsuko Morota, Saitama, both of Japan

[73] Assignee: Sony Corporation, Tokyo, Japan

[21] Appl. No.: 652,418

[22] Filed: May 23, 1996

[30] Foreign Application Priority Data

Jun. 22, 1995 [JP] Japan .................. P07-156188

[51] Int. Cl.$^6$ .......................................... H04N 3/27
[52] U.S. Cl. .................. 348/554; 348/556; 348/558
[58] Field of Search ........................ 348/554, 555, 348/556, 557, 558; H04N 3/27, 5/46

[56] References Cited

U.S. PATENT DOCUMENTS 5,257,106  10/1993  Maruoka ................... 348/556
5,315,391  5/1994  Lee ........................... 348/554

Primary Examiner—Sherrie Hsia

[57] ABSTRACT

A picture outputting apparatus in which a plurality of picture signals are selectively entered and displayed on a screen with a picture mode matched to the input picture signals. An optimum screen mode is individually stored in terms of input terminals to which picture signals are entered or the frequencies of the input picture signals. A plurality of picture signals are selectively entered at input units $I_1$ to $I_6$. The screen modes are set in association with the plurality of the picture signals. A storage unit 17 stores the screen mode information as set by the setting units 9, 10. A display unit 147 displays a picture corresponding to the optional picture signals selectively entered at the input units $I_1$ to $I_6$. A judgment unit 15 judges the sorts of the picture signals entered at the input units $I_1$ to $I_6$. A controller 146 controls the display unit 147, based upon the results of the judgment unit 15, so that a picture corresponding to an optional one of the picture signals entered at the input units $I_1$ to $I_6$ will be displayed on the screen with the screen mode matched to the optional picture signal.

3 Claims, 3 Drawing Sheets

VIDEO DISPLAY IN WHICH A SCREEN MODE FOR DIFFERENT INPUT SIGNALS IS SET BASED ON STORED INFORMATION

BACKGROUND OF THE INVENTION

1. Field of the Invention

This invention relates to a picture outputting apparatus such as a television, monitor, projector or liquid crystal. More particularly, it relates to a picture outputting apparatus in which plural picture signals are selectively entered and displayed on a screen with a picture mode matched to the input picture signals.

2. Related Art

A high definition television (HDTV) system realizes a picture and speech clearer and richer in ambience that those achieved with the standard television system, such as NTSC system. Thus it is said to be necessary that, with the HDTV system, the resolution should be approximately twice that of the NTSC system in both the horizontal and vertical directions, the screen should be a large size and horizontally elongated with the aspect ratio larger than 4:3, and the viewing should be distance be approximately thrice the screen height. Such an HDTV system is superior in picture quality and speech quality so that the system is expected to find extensive application not only in broadcasting but also in printing, publication, motion picture production or in computer graphics.

In a picture outputting apparatus for receiving not only HDTV signals but also NTSC signals different in horizontal frequency from the HDTV signals for reproducing the picture and the speech, the screen mode is adapted for being selectively set responsive to received signals. That is, by switching picture signals to be outputted as a picture and by setting the screen mode responsive to received signals, the HDTV signals can be viewed with a full mode with the aspect ratio of 16:9, while NTSC signals can be viewed with the normal mode with the aspect ratio of 4:3. If it is desired to view a picture from a tape recorder connected to the picture outputting apparatus, the input is switched to picture signals supplied from the video tape recorder to the picture outputting apparatus and the picture mode is set to a mode associated with the input picture signals, whereby the picture from the video tape recorder can be viewed with an optimum screen mode.

FIG. 1 shows, in a flowchart, an illustrative input switching operation for picture signals outputted for display.

Referring to FIG. 1, the user issues at step S41 an input switching command to the picture outputting apparatus, using e.g., a remote controller provided on the picture outputting apparatus, for switching picture signals to be outputted as a picture to HDTV signals, NTSC signals or to picture signals supplied from the video tape recorder.

The user then checks at step S42 picture signals outputted as a picture by the outputting apparatus.

The user then judges whether or not the currently set screen mode is appropriate for picture signals to which the input is to be switched. That is, in carrying out the input switching of the picture signals, it is judged at step S43 whether or not the screen mode needs to be changed.

If it is judged that the screen mode has to be changed, the user selects, at step S44, the screen mode most appropriate for the picture signals to which the input is to be switched, using e.g., a remote controller, and issues a setting command for setting the picture mode to the picture outputting apparatus.

By the above-described input switching operation and the screen mode setting operation, picture signals to be outputted as a picture by the picture outputting apparatus are switched, and the screen mode matched to the selected picture signals is established.

However, the above-described picture outputting apparatus has only a memory for storing a sole screen mode irrespective of the number of the input picture signals or the number of input terminals to which reception signals and picture signals are entered. The result is that, each time the user switches to the HDTV signals, NTSC signals or to picture signals supplied from a video tape recorder, the user has to select and establish again an optimum screen mode for the picture signals to which the input is switched.

That is, the user has to select and establish again an optimum screen mode for the picture signals to which the input is switched each time he or she performs an operation of switching the input terminals on reception of signals with different aspect ratios or an operation of switching picture signals with different frequencies.

SUMMARY OF THE INVENTION

It is therefore an object of the present invention to provide a picture outputting apparatus in which a screen mode optimum for each of the input terminals to which picture signals are entered or for each of the frequencies of input picture signals are separately stored for assuring superior operability.

According to the present invention, there is provided a picture outputting apparatus including inputting means to which plural softs of picture signals are selectively entered, setting means for setting screen modes in association with the plural softs of the picture signals, storage means for storing plural softs of the screen mode information as set by the setting means; display means for displaying a picture corresponding to an optional one of the picture signals selectively entered by the inputting unit, judgment means for judging the sorts of the picture signals entered to the inputting means, and control means for controlling the display means so that a picture corresponding to the optional picture signal entered to the inputting means is displayed on the screen with the screen mode matched to the optional picture signals based upon the results of judgment by the judgment means.

Preferably, setting means sets the screen mode in terms of the frequencies of the picture signals, and the judgment means judges the frequency of the optional picture signals entering the inputting means. Thus it becomes possible to store the respective screen modes in association with the different frequencies.

Preferably, the setting means sets the screen mode in terms of respective input terminals at the input terminals, and the judgment means judges the input terminals to which optional picture signals are entered. Thus it becomes possible to store the respective screen modes in association with the different input terminals.

With the picture outputting apparatus of the present invention, plural sorts of picture signals are selectively entered at input units. The screen modes are set in association with the plural sorts of the picture signals. The storage unit stores the plural sorts of the screen mode information as set by the setting units, while the display unit displays a picture corresponding to the optional picture signals selectively entered at the input units. The judgment unit judges the sorts of the picture signals entered at the input units. The controller controls the display unit, based upon the results of detection by the judgment unit, so that a picture corresponding to an optional one of the picture signals entered at the input units will be displayed on the screen with the screen mode matched to the optional picture signal. This eliminates a troublesome operation of re-establishing the screen mode each time picture signals are switched by the inputting unit, thus improving operability of the picture outputting apparatus.

DESCRIPTION OF THE PREFERRED EMBODIMENTS

Figure 1:
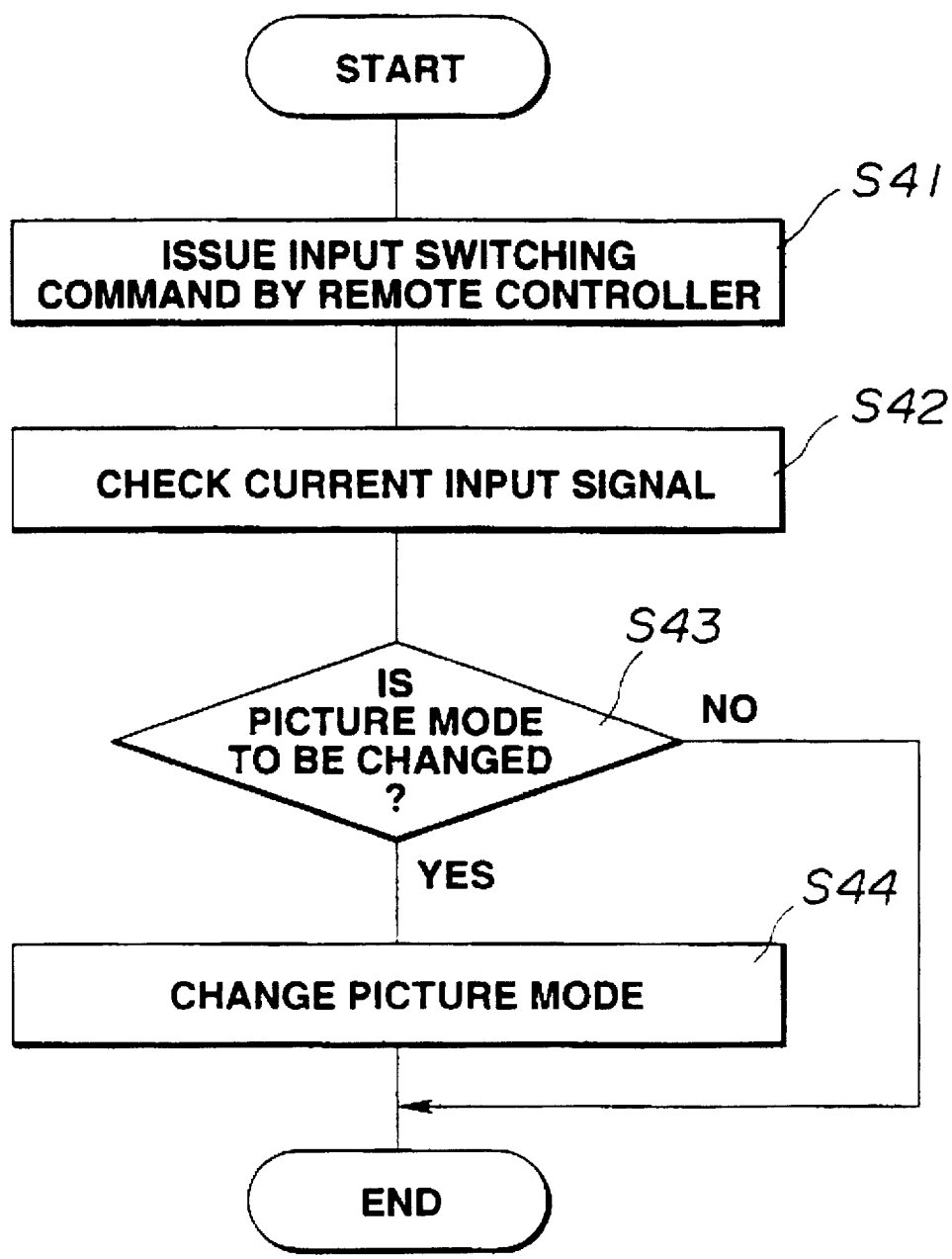
FIG. 1 is a flowchart for illustrating the conventional input switching operation.
Figure 2:
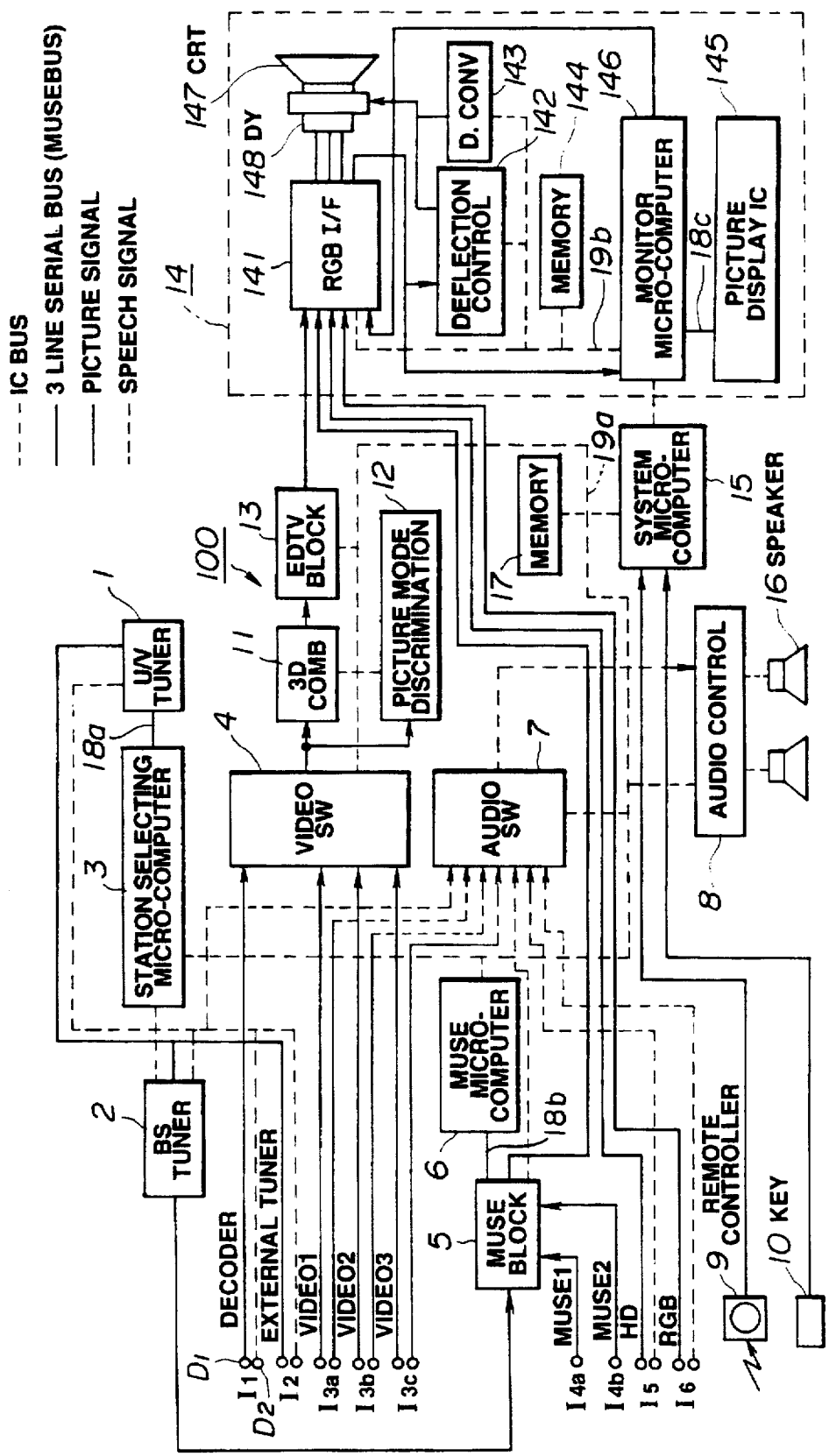
FIG. 2 is a block diagram showing an arrangement of a high definition television apparatus employing a picture outputting apparatus according to the present invention.

Referring to the drawings, preferred embodiments of the present invention will be explained in detail.

That is, a high definition television apparatus 100 has a U/V tuner 1 supplied with U/V signals received by an antenna for UHF/VHF (U/V) broadcasting antenna, not shown. The apparatus 100 also includes a BS tuner 2 supplied with BS signals received by an antenna for satellite broadcasting (BS), also not shown, and a station selecting micro-computer 3. The apparatus 100 also includes a decoder terminal $I_1$, an external tuner terminal $I_2$ and video terminals $I_{3a}$ to $I_{3c}$. The apparatus 100 also includes multiple sub-Nyquist sampling encoding (MUSE) terminals $I_{4a}$ and $I_{4b}$, and a high definition (HD) terminal $I_5$. The apparatus 100 also includes an RGB terminal $I_6$, a remote controller 9, an actuating key 10, a MUSE block 5, a MUSE micro-computer 6, a video switch 4 and an audio switch 7. The apparatus 100 also includes a three-dimensional comb filter 11 and an extended definition television (EDTV) block 13. The apparatus 100 further includes a screen mode discrimination unit 12, a speaker 16, an audio controller 8, a screen display unit 14, a memory 17, and a system micro-computer 15.

The decoder terminal $I_1$, external tuner terminal $I_2$, video terminals $I_{3a}$ to $I_{3c}$, HD terminal $I_5$ and the RGB terminal $I_6$, are each made up of a picture signal input terminal $p_1$ and a speech signal input terminal $p_2$.

The screen display unit 14 includes an RGB interfacing unit 141, a picture distortion adjustment unit 142, a data separating unit 143, a picture display IC 145, a monitor micro-computer 146, a display unit 147 comprised of a cathode ray tube (CRT) and a deflection yoke 148.

The system micro-computer 15 is adapted to control the station selecting micro-computer 3, MUSE micro-computer 6, audio switch 7, audio controller 8, memory 17, video switch 4, three-dimensional comb filter 11, a screen mode discrimination unit 12, EDPTV block 13 and the monitor micro-computer 146 via an IIC bus interface 19a manufactured by PHILLIPS COMPANY (IIC bus). The monitor micro-computer 146 controls the RGB interfacing unit 141, picture distortion adjustment unit 142, convergence correction unit 143 and the memory 144 over an ICC bus $19_b$.

The station selecting micro-computer 3 controls the U/V tuner 1 over a three-line serial bus (MUSE bus) $18_a$, while the MUSE micro-computer 6 controls the MUSE block 5 over a MUSE bus $18_b$, and the monitor micro-computer 146 controls the screen display IC 145 over a MUSE bus $18_c$.

The video switch 4 is fed with one of the picture signals outputted by the U/V tuner 1, picture signals outputted by the BS tuner 2, picture signals entering the decoder terminal $I_1$ and picture signals entering the external tuner terminal $I_2$, and picture signals entering the video terminals $I_{3a}$ to $I_{3c}$. An output signal of the video switch 4 is supplied to the three-dimensional comb filter 11 and to the screen mode discrimination unit 12. An output signal of the three-dimensional comb filter 11 is supplied to the RGB interfacing unit 141.

The MUSE block 5 is supplied with an output signal of the BS tuner 2 and signals entering the MUSE terminals $I_{4a}$ and $I_{4b}$. The picture signals outputted by the MUSE block 5 are supplied to the RGB interfacing unit 141. The picture signals entering the HD terminal $I_5$ and the picture signals entering the RGB terminal $I_6$ are also supplied to the RGB interfacing unit 141.

The audio switch 7 is supplied with one of the speech signals outputted from the U/V tuner 1, speech signals outputted from the BS tuner 2, speech signals entering the decoder terminal $I_1$ and the speech signals entering the external tuner terminal $I_2$, speech signals entering the video terminals $I_{3a}$ to $I_{3c}$, speech signals outputted from the MUSE block 5, speech signals entering the HD terminal $I_5$ and speech signals entering the RGB terminal $I_6$. An output signal of the audio switch 7 is issued via the audio controller 8 at the speaker 16.

The RGB interfacing unit 141 is fed with an output signal from the EDTV block 13, an output signal from the MUSE block 5 and the speech signals entering the HD terminal $I_5$ and the RGB terminal $I_6$, while being also fed with an output signal of the screen display IC 145. An output signal of the RGB interfacing unit 141 is outputted via the deflection yoke 148 to the display unit 147, while being supplied to the picture distortion adjustment unit 142 and to the monitor micro-computer 146. Output signals of the picture distortion adjustment unit 142 and the data separation unit 143 are supplied to the deflection yoke 148.

The above-described arrangement of the high definition television apparatus 100 is now explained in detail.

The remote controller 9 and the actuating key 10 may be used by the user for commanding various operations of the apparatus. That is, by the remote controller 9 and the actuating key 10, it is possible to command the power on/off, switching of the input picture signals and the channels over which the picture is outputted by the apparatus 100 or the volume of the output speech.

It is also possible for the remote controller 9 and the actuating key 10 to separately set screen modes appropriate for picture signals obtained by the U/V tuner 1, picture signals obtained by the BS tuner 2 and respective picture signals entering the decoder terminal $I_1$, external tuner terminal $I_2$, video terminals $I_{3a}$ to $I_{3c}$, MUSE terminals $I_{4a}$ and $I_{4b}$, HD terminal $I_5$ and RGB terminals $I_6$. The system micro-computer 15 causes the screen mode information set for each input picture signal set by the remote controller 9 and the actuating key 10 and the channel information, input picture signal switching information and the volume information, designated by the remote controller 9 and the actuating key 10, to be stored in the memory 17. The system micro-computer 15 performs various control operations, using the IIC buses $19_a$ and $19_b$, based upon the information of various sorts stored in the memory 17, so that the operations will occur in accordance with instructions from the remote controller 9 and the actuating key 10. The system micro-computer 15 also transmits the information stored in the memory 17 and required for screen display, such as the screen mode information associated with the picture signals designated by the remote controller 9 and the actuating key 10 or the adjustment data for adjusting picture distortion.

The monitor micro-computer 146 causes the information of various sorts from the system micro-computer 15 to be stored in the memory 144, and performs various control operations for screen display, based upon the various information stored in the memory 144, using the IIC bus $19_b$.

The various control operations for the system micro-computer 15 and the monitor micro-computer 146 will be discussed in detail subsequently.

The U/V tuner 1 selects and decodes a desired channel from the U/V signals received by a U/V broadcasting antenna, not shown, under control by the station-selection micro-computer 3, and generates picture and speech signals from the demodulated base-band signals.

The BS tuner 2 selects and decodes a desired channel of the BS signals received by the BS antenna, not shown, and generates picture and speech signals from the demodulated base-band signals.

To the decoder terminal $I_1$ is connected a decoder, not shown, for decoding the BS signals received by the BS antenna so as to be selected by the BS tuner 2 and scrambled for prohibiting reception by unauthorized persons. To the decoder terminal $I_1$ are supplied the picture signals and the speech signals produced by the decoder.

The station-selecting micro-computer 3 selects one of the picture and speech signals produced by the U/V tuner 1, picture and speech signals produced by the BS tuner 2, picture and speech signals produced by the decoder terminal $I_1$ and picture and speech signals entering the external tuner $I_2$, under control by the system micro-computer 15. The station-selecting microcomputer 3 manages control so that the selected picture signals and the selected audio signals will be supplied to the video switch 4 and to the audio switch 7, respectively.

The picture signals entering the video terminals $I_{3a}$ to $I_{3c}$ are also supplied to the video switch 4, while the speech signals entering the video terminals $I_{3a}$ to $I_{3c}$ are also supplied to the audio switch 7. The speech signals entering the HD terminal $I_5$ and the RGB terminal $I_6$ are also supplied to the audio switch 7.

The picture signals entering the HD terminal $I_5$ and the RGB terminal $I_6$ are supplied to the RGB interfacing unit 141.

To the MUSE terminals $I_{4a}$ and $I_{4b}$ are supplied MUSE signals band-compressed by the MUSE system which is the band compression signal transmission system developed for broadcasting high-vision signals over a sole BS broadcasting channel.

The MUSE block 5 decodes signals demodulated by the BS tuner 2 and the MUSE signals entering the MUSE terminals $I_{4a}$ and $I_{4b}$, under control by the MUSE microcomputer 8, for generating high-vision signals and speech signals. The MUSE block 5 sends the generated high-vision signals to the RGB interfacing unit 141, while sending the generated speech signals to the audio switch 7.

The video switch 4 selectively transmits the picture signals selected by the station-selecting micro-computer 3 and the picture signals entering the video terminals $I_{3a}$ to $I_{3b}$ to the screen mode discrimination unit 12 and to the three-dimensional comb filter 11 under control by the system micro-computer 15.

The screen mode discrimination unit 12 detects the "wide" discrimination signals in the picture signals from the video switch 4, under control by the system micro-computer 15, and transmits the result of detection to the system micro-computer 15. The "wide" discrimination signal is a sort of the picture signal discrimination information superimposed in the vertical blanking period of the reproduced signal reproduced by the video tape recorder.

Thus the system micro-computer 15 causes the result of detection of the "wide" discrimination signals from the screen mode discrimination unit 12 to be stored in the memory 17 as the picture signal discrimination information. The system micro-computer 15 also transmits the detected result as the screen display information to the monitoring micro-computer 146. The monitoring micro-computer 146 causes the information from the system micro-computer 15 to be stored in the memory 144.

The three-dimensional comb filter 11 is a comb filter for separating luminance signals and chroma signals from each other (Y/C separation) in accordance with a motion adaptive three-dimensional time-space YC separation system. Thus the three-dimensional comb filter 11 separates the picture signals from the video switch 4 into Y and C components, under control by the system micro-computer 15, for supplying the Y/C separated picture signals to the EDTV block 13.

The EDTV is classified into the first generation and the second generation both of which are compatible with the current NTSC system. The first-generation EDTV has an aspect ratio of 4:3, while the second-generation EDTV (EDTV2) has an aspect ratio of not less than 4:3, for example, 16:9.

The EDTV block 13 detects a discrimination control signal for discriminating the EDTV2 from the picture signal, YC-separated by the three-dimensional comb filter 11, under control by the system micro-computer 15, while decoding reinforcement signals. The EDTV block 13 transmits picture signals, YC-separated by the three-dimensional comb filter 11, to the RGB interfacing unit 141, while transmitting the results of detection of the discrimination control signal and the decoded reinforcement signals to the system micro-computer 15.

The system micro-computer 15 causes the results of detection of the discrimination control signal by the EDTV block 13 and the reinforcement signal to be stored as the picture signal discrimination information in the memory 17, while transmitting the results of detection of the discrimination control signal and the reinforcement signal to the monitoring micro-computer 146 as the screen display information. The monitoring micro-computer 146 causes the information from the system micro-computer 15 to be stored in the memory 144.

The RGB interfacing unit 141 selects, under control by the monitoring micro-computer 146, one of the picture signals from the MUSE block 5, picture signals entering the HD terminal $I_5$, picture signals entering the RGB terminal $I_6$ and the picture signals Y-C separated by the EDTV block 13, which are to be outputted as picture. The RGB interfacing unit 141 generates, from the selected picture signals, R, G and B signals for driving the display unit 147, and outputs the generated R, G and B signals.

That is, the RGB interfacing unit 141 selects, under control by the monitoring micro-computer 146, the picture signals designated by the remote controller 9 or the actuating key 10, from plural input picture signals, and detects the horizontal/vertical synchronization signals from the selected picture signals. The RGB interfacing unit 141 transmits the detected horizontal/vertical synchronization signals to the picture distortion adjustment unit 142 and to the monitoring micro-computer 146.

The monitoring micro-computer 146 counts horizontal/vertical synchronization signals from the RGB interfacing unit 141 and monitors the R, G and B signals currently outputted from the RGB interfacing unit 141. The monitoring micro-computer 146 shapes data in the memory 144, required for screen display, so as to be usable as screen-display IC 145, and transmits the shaped data to the screen display IC 145.

The screen-display IC 145 generates screen-display RGB signals, based upon data from the monitoring micro-computer 146, and transmits the generated RGB signals for screen display to the RGB interfacing unit 141.

The monitoring micro-computer 146 transmits the various information stored in the memory 144 for screen display to the RGB interfacing unit 141, picture distortion adjustment unit 142 and to the convergence correction unit 143.

The RGB interfacing unit 141 selects the picture signals to be outputted as the picture, based upon the various sorts of the information from the monitoring micro-computer 146, and adjusts the selected picture signals as to white balance adjustment, picture and lightness, for generating R, G and B signals for driving the display unit 147. The RGB interfacing unit 141 superimposes the RGB signals for screen display from the screen display IC 145, on the generated R, G and B signals, and transmits the resulting signal to the deflection tube 148.

The deflection yoke 148 operates for deflection and scanning by the R, G and B signals, on which the screen display RGB signals from the RGB interfacing unit 141 are superimposed, for generating a raster on the screen of the display unit 147. At this time, the picture distortion adjustment unit 142 controls the deflection yoke 148, based upon the various items of the information from the monitoring micro-computer 146, for adjusting picture distortion. The convergence correction unit 143 controls the deflection yoke 148 based upon the various items of the information from the micro-computer 146 for convergence adjustment. Thus the picture corresponding to the picture signals designated by the remote controller 9 or the actuating key 10 is displayed on the screen of the display unit 147 with a screen mode matched to the picture signals.

The audio switch 7 selects, under control by the system micro-computer 15, the speech signals matched to the picture signals selected by the video switch 4, from the speech signals selected by the station-selecting micro-computer 3, speech signals entering the video terminals $I_{3a}$ to $I_{3c}$, speech signals entering the HD terminal $I_5$ and speech signals entering the RGB signals $I_6$, and sends the elected speech signals to the audio controller 8.

The audio controller 8 adjusts, under control by the audio switch 4, the sound volume, balance and sound quality of the speech signals selected by the system micro-computer 15, and outputs the thus adjusted speech signals via the speaker 16.

Thus the speech matched to the picture signals switched as described above is outputted from the speaker 16.

Figure 3:
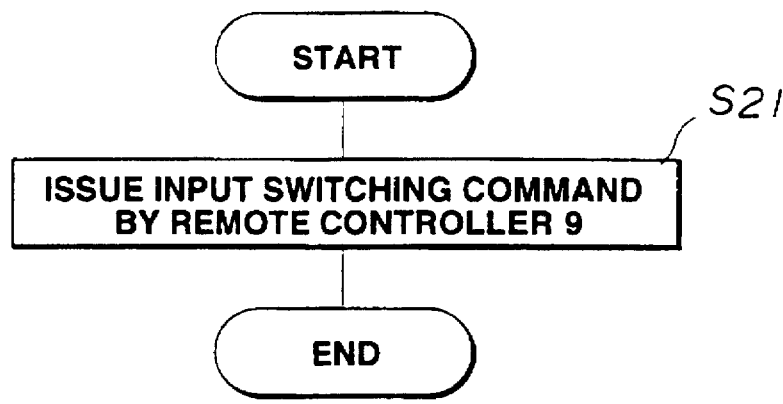
FIG. 3 is a flowchart showing an input switching operation in the high definition television apparatus shown in FIG. 2.
Figure 4:
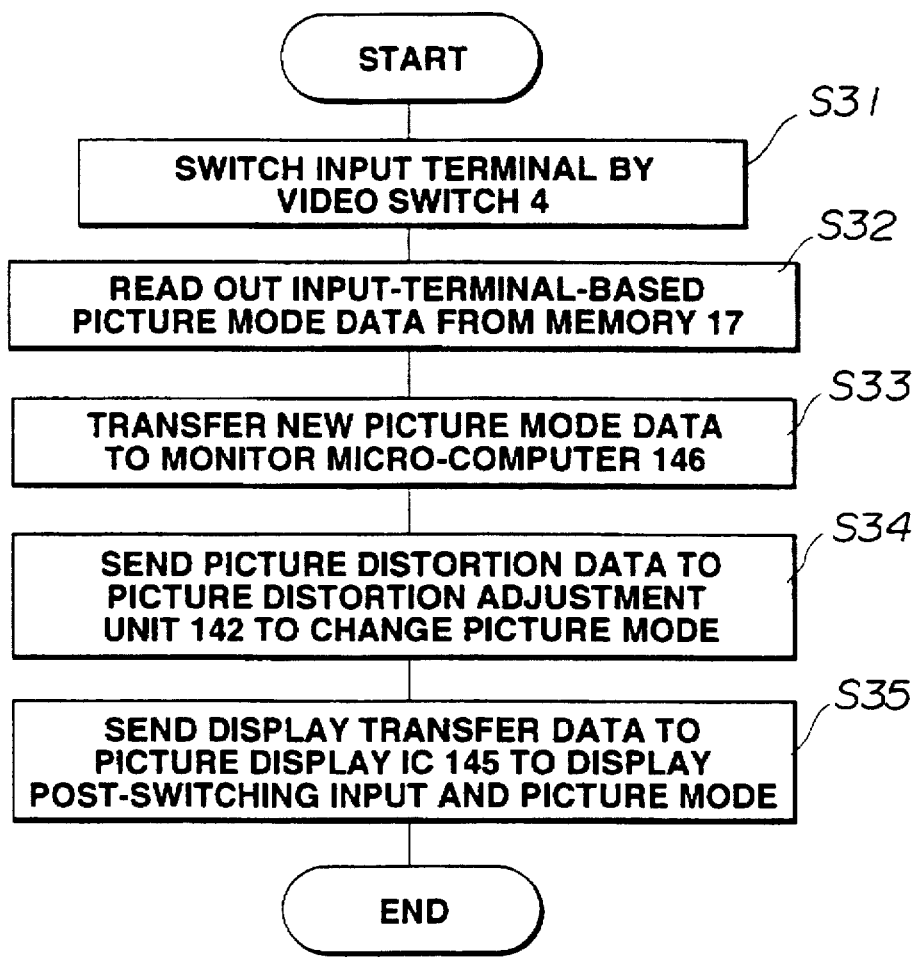
FIG. 4 is a flowchart showing the operation occurring during the input switching operation within the picture outputting apparatus shown in FIG. 2.

FIGS. 3 and 4 show, by flowcharts, the input switching operation and the operation occurring in the above-described high-vision television apparatus 100 during input switching.

If the user desires to switch picture signals outputted as a picture, he or she actuates, at step S21, the remote controller 9 for issuing an input switching command to the high-vision television apparatus 100, as shown in FIG. 3. Simultaneously, the high-vision television apparatus 100 receives an input switching command by the remote controller 9.

The system micro-computer 15 then controls, at step S31, the video switch 4 so that picture signals outputted as a picture will be switched to picture signals designated by the input switching command, as shown in FIG. 4.

The system micro-computer 15 then reads out at step S32 the screen mode information associated with the picture signals designated by the input switching command, or the information of various sorts for screen display, such as picture distortion data, from the memory 17.

The system micro-computer 15 then routes at step S33 the information of various sorts read out from the memory 17 to the monitoring micro-computer 146.

The monitoring micro-computer 146 causes the information of various sorts from the system micro-computer 15 to be stored in the memory 144. The monitoring micro-computer 146 then reads out the picture distortion data, from the information of various sorts stored in the memory 144, and transmits the read-out picture distortion data to the picture distortion adjustment unit 142. The picture distortion adjustment unit 142 adjusts picture distortion at the deflection yoke 148, based upon the picture distortion data from the monitoring micro-computer 146, for switching to the screen mode matched to the switched picture signals (step S34).

The monitoring micro-computer 146 sends display transfer data, which is RGB signals for screen display, to the screen display IC 145. This causes a picture corresponding to picture signals designated by the input switching command to be displayed on the screen of the display unit 147 with a screen mode matched to the picture signals (step S35).

In the instant embodiment, the picture mode information data for respective picture signals different in frequency and input terminals are separately stored in the memory 17, and a picture corresponding to the picture signals designated by the input switching command is displayed on the screen with the picture mode matched to the picture signals, so that the operator is not in need of re-establishing the screen mode each time the input switching operation is to be made. If the screen modes for respective ones of the plurality of picture signals are once set, the user is able to view the desired picture with the optimum screen mode subject only to the input switching operation.

For example, if the high-vision signals with the horizontal frequency of 33.75 kHz and the VGA signals with the horizontal frequency of 31.5 kHz enter the HD terminal $I_5$ and the RGB terminal $I_6$, respectively, and if the high-vision signals and the VGA signals are desired to be viewed with the full mode with the aspect ratio of 16:9 and with the normal mode with the aspect ratio of 4:3, the viewer is able to view the selected picture with the optimum screen mode, subject only to the input switching operation between the high-vision signal and the VGA signal, if once the screen mode matched to the high-vision signal (16:9) and the screen mode matched to the VGA signal (4:3) are set.

What is claimed is:

1. A picture outputting apparatus comprising:

inputting means to which a plurality of picture signals are selectively entered;

setting means for setting screen modes in association with said plurality of picture signals;

storage means for storing screen mode information for said plurality of picture signals as set by said setting means;

display means for displaying a picture corresponding to an optional picture signal of the plurality of picture signals selectively entered by said inputting means;

determining means for determining the kind of said plurality of picture signals entered to said inputting means; and control means for controlling said display means so that a picture signal corresponding to the optional picture signal entered to said inputting means is display on a screen with a screen mode matched to said optional picture signal based upon the results of said determining means.

2. The picture inputting apparatus as claimed in claim 1 wherein said setting means sets a screen mode in terms of the frequencies of said plurality of picture signals; and wherein said determining means determines the frequency of the optional picture signal entered to said inputting means.

3. The picture inputting apparatus as claimed in claim 1 wherein said inputting means includes input terminals and said setting means sets a screen mode in terms of respective input signals at said input terminals and wherein said determining means determines the input terminals to which the optional picture signal is entered.

* * * * *